United States Patent [19]

Nishiguchi et al.

[11] Patent Number: 4,698,643

[45] Date of Patent: Oct. 6, 1987

[54] SERIAL TYPE THERMAL HEAD

[75] Inventors: Yasuo Nishiguchi; Tsuyoshi Yasutomi, both of Kokubu; Ryoichi Shiraishi, Kagoshima, all of Japan

[73] Assignee: Kyocera Corporation, Kyoto, Japan

[21] Appl. No.: 812,971

[22] Filed: Dec. 24, 1985

[30] Foreign Application Priority Data

Dec. 27, 1984 [JP] Japan .......................... 59-198400[U]

[51] Int. Cl.$^4$ .............................................. G01D 15/10

[52] U.S. Cl. ................................ 346/76 PH; 400/120

[58] Field of Search ................... 346/76 PH; 400/120; 219/216 PH, 543; 250/317.1, 318

[56] References Cited

U.S. PATENT DOCUMENTS 3,631,512 12/1971 Janning .......................... 346/76 PH

*Primary Examiner*—Arthur G. Evans

*Attorney, Agent, or Firm*—Spensley Horn Jubas & Lubitz

[57] ABSTRACT

Disclosed is a thermal head in which a plurality of heat-generating elements are arranged on a substrate on a line oblique to the scanning direction of the thermal head so that the projecting scanning region of each heat-generating element overlaps the projection scanning region of the adjacent heat-generating element over a minute space without any blank clearance between the projecting scanning regions. In this thermal head, mutual thermal influences in the heat-generating elements can be completely eliminated, and the printing quality can be improved.

8 Claims, 7 Drawing Figures

Fig. 3
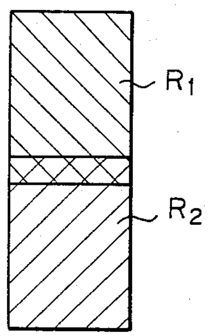
Fig. 4
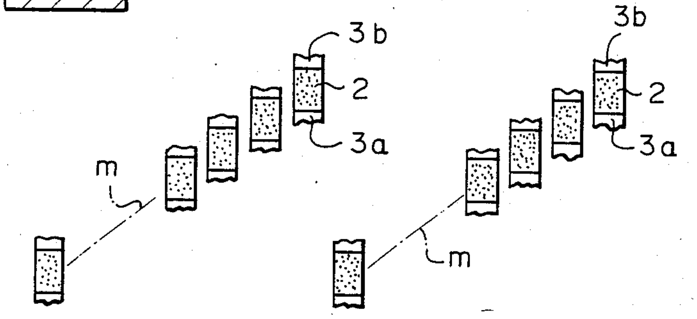
Fig. 5-A
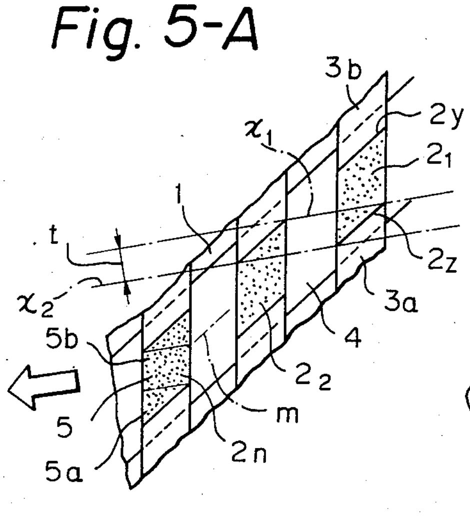
Fig. 5-B
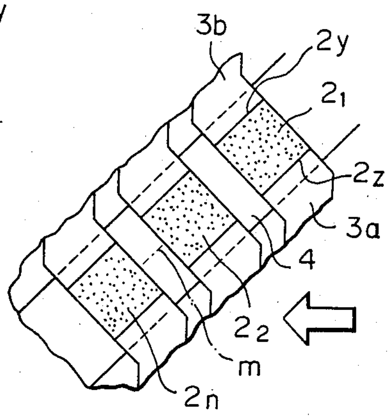

SERIAL TYPE THERMAL HEAD

BACKGROUND OF THE INVENTION (1) Field of the Invention

The present invention relates to a thermal head for use in heat sensitive recording. More particularly, the present invention relates to a serial type thermal head in which printing of high quality can be performed without forming a blank space between printing dots while eliminating mutual thermal influences in heat-generating elements.

(2) Description of the Prior Art

In a conventional serial type thermal head, as shown in FIG. 6 of the accompanying drawings, a plurality of heat-generating resistor elements 12, which are selectively actuated, are arranged on a substrate 1 in a longitudinal line, and in order to avoid formation of a blank space in an area to be printed, the respective heat-generating resistor elements 12 are inclined at a predetermined angle with respect to the scanning direction (indicated by an arrow in FIG. 6) so that the lower edge portion 12*a* of each heat-generating resistor element 12 and the upper edge portion 12*b* of the adjacent heat-generating resistor element 12 overlap each other with respect to the scanning direction (see Japanese patent application Laid-Open Specification No. 141640/78).

However, this conventional thermal head involves the following problem. More specifically, since a plurality of heat-generating resistor elements 12 are arranged in a longitudinal line, the distance l between every two adjacent heat-generating resistor elements is very narrow and hence, mutual thermal influences in the adjacent heat-generating resistor elements 12 cannot be avoided. Accordingly, when printing is performed by selectively actuating one heat-generating resistor element 12 to generate Joule heat, the printing density greatly differs according to whether or not heat is generated in the adjacent heat-generating resistor element.

SUMMARY OF THE INVENTION

One object of the present invention is to solve this problem involved in the conventional thermal head, and it is thus a primary object of the present invention to provide a thermal head in which printing of high quality can be performed without forming a blank space in an area to be printed while avoiding mutual thermal influences in heat-generating resistor elements.

In accordance with the present invention, there is provided a serial type thermal head comprising a plurality of heat-generating elements formed on a substrate, each heat-generating element comprising a heat-generating resistor and a pair of electrodes connected in series to the heat-generating resistor, wherein the heat-generating elements are arranged on a line oblique to the scanning direction of the thermal head with a small distance being formed between every two adjacent heat-generating elements with such a positional relationship that the projection scanning region of each heat-generating element is contiguous to the projection scanning region of the adjacent heat-generating element without any clearance or the projection scanning region of each heat-generating element overlaps the projection scanning region of the adjacent heat-generating element only over a minute space.

In accordance with one preferred embodiment of the present invention, there is provided a serial type thermal head as set forth above, wherein in each of the heat-generating elements, the connection edge sides of the heat-generating resistor to the electrodes are formed in parallel to the arrangement direction of the heat-generating elements, and a ridged glaze layer is formed between the substrate and the heat-generating elements and the heat-generating elements are arranged in the central portion of the glaze layer.

BRIEF DESCRIPTION OF THE DRAWINGS

FIG. 3 is a plane view showing the state of printing by the thermal head of the present invention.

FIGS. 4, 5-A and 5-B are plane views illustrating other embodiments of the thermal head according to the present invention.

Figure 1:
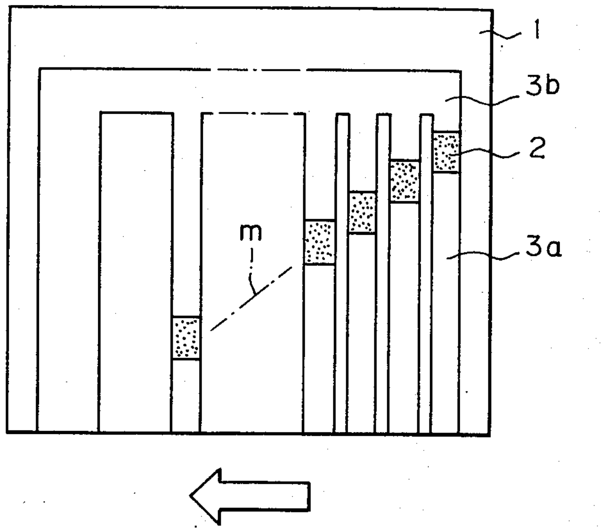
FIG. 1 is a plane view showing an embodiment of the thermal head according to the present invention.

In the drawings. each of reference numerals 1 and 11 represents a substrate, each of reference numerals 2 and 12 represents a heat-generating resistor element, and each of reference numerals 3 and 13 represents an electrode.

DETAILED DESCRIPTION OF THE PREFERRED EMBODIMENTS

The present invention will now be described in detail with reference to embodiments illustrated in FIGS. 1 through 5 of the accompanying drawings.

FIG. 1 is a plan view showing one embodiment of the thermal head according to the present invention. A substrate 1 is composed of a ceramic such as alumina, and heat-generating resistor elements 2 are arranged on the substrate 1. Each heat-generating resistor element 2 is connected in series to an individual electrode 3*a* and a common electrode 3*b* to construct a heat-generating element.

Figure 2:
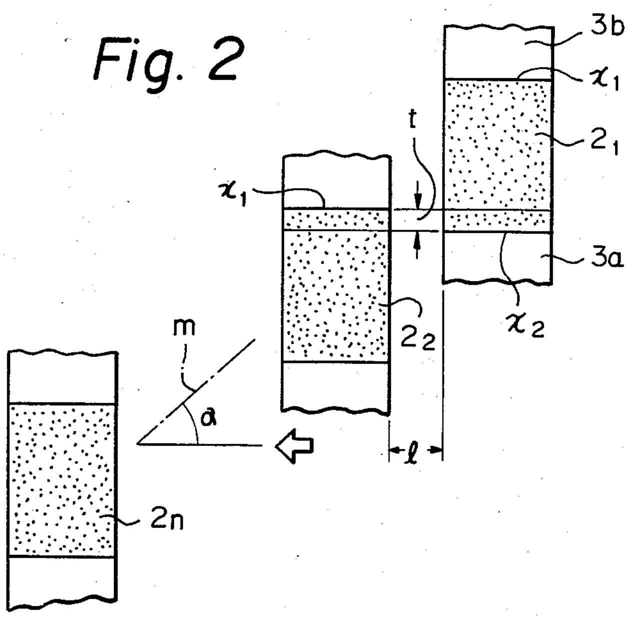
FIG. 2 is an enlarged view showing a main portion of the thermal head shown in FIG. 1.
Figure 6:
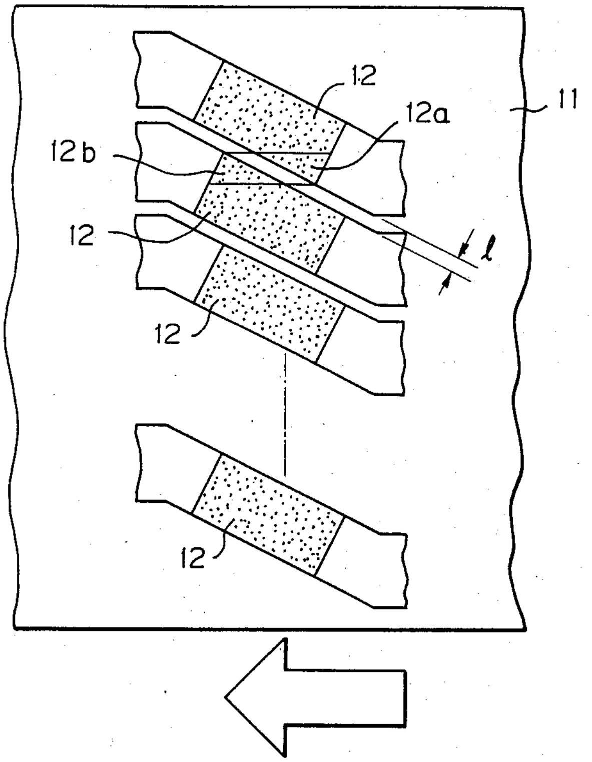
FIG. 6 is a plane view showing a conventional thermal head.

According to the present invention, the heat-generating elements are arranged on the substrate 1 so that they are located on a line m oblique to the scanning direction (indicated by an arrow in FIG. 1) and a small space is formed between every two adjacent heat-generating elements. In order not to form a blank space between adjacent printing dots, it is important that the heat-generating elements should be arranged so that the projection scanning region of each heat-generating element $2_1$ is contiguous to the projection scanning region of the adjacent heat-generating element without any clearance or the projection scanning region of each heat-generating element $2_1$ overlaps the projection scanning region of the adjacent heat-generating element $2_2$ only over a minute space, as shown in FIG. 2.

In the instant specification and appended claims, by the term "projection scanning region" is meant the region between upper and lower tangential lines of each heat-generating element to the line of the scanning direction of the thermal head. In the case of the rectangular heat-generating element $2_1$ shown in FIG. 2, the region surrounded by the extension of the upper side $x_1$ and the extension of the lower side $x_2$ is the projection scanning region of the heat-generating element $2_2$. It will be understood that in the embodiment shown in FIG. 2, the projection scanning regions of the first heat-generating element $2_1$ and the adjacent second heat-generating element $2_2$ overlap each other over a minute space t between the extension of the lower side $x_2$ of the first heat-generating element $2_1$ and the extension of the upper side $x_1$ of the adjacent second heat-generating element $2_2$. The same positional relationship is established between every two adjacent heat-generating elements of the heat-generating elements $2_2$ through $2_n$.

If the heat-generating elements $2_1$ through $2_n$ are arranged on a line inclined at a predetermined angle to the scanning direction so that the projection scanning region of each heat-generating element is contiguous to the projection scanning region of the adjacent heat-generating element without any clearance or the projection scanning region of each heat-generating element overlaps the projection scanning region of the adjacent heat-generating element only over a minute space, the distance l between every two adjacent heat-generating elements of the heat-generating elements $2_1$ through $2_n$ can be increased and therefore, mutual thermal influences in the heat-generating elements $2_1$ through $2_n$ can be completely avoided, and no blank space is formed between printing dots, as shown in FIG. 3. Incidentally, in FIG. 3, $R_1$ represents the printing dot of the heat-generating element $2_1$ and $R_2$ represents the printing dot of the heat-generating element $2_2$.

The heat-generating resistor elements $2_1$ through $2_n$ are composed of titanium, titanium oxide (TiO), chromium silicate, tantalum silicate or tantalum nitride ($Ta_2N$), and they are formed on the substrate 1 by a known film-forming method such as sputtering or vacuum evaporation deposition and a known etching method.

Electrodes 3, composed of an electric conductor such as gold (Au), silver (Ag) or aluminum (Al), are formed on both the ends of each of the heat-generating resistor elements $2_1$ through $2_n$. The electrodes 3 are disposed to supply an electric power to the heat-generating resistor element 2. The electrodes 3 are formed by a known film-forming method and a known etching method so that the electrodes 3 overlap at least partially the heat-generating resistor element 2.

The heat-generating resistors 2 may be formed directly on the substrate 1, or they may be formed on the substrate 1 through a glaze layer so as to prevent heat generated from the heat-generating resistor 2 from escaping to the substrate and to discharge and diffuse this heat when the heat-generating resistor is de-energized. A glass composition comprising silica as the main component and having a thermal expansion coefficient which is substantially equal to that of the substrate is used for formation of the glaze layer.

It is preferred that the thickness of each heat-generating resistor 2 be 0.05 to 3.0 μm, and that the thickness of the electrodes 3*a* and 3*b* be 0.5 to 3.0 μm. In the case where the glaze layer is formed between the substrate and the heat-generating resistors, it is preferred that the glaze layer be arranged so that the maximum thickness of the glaze layer be 50 to 60 μm and the width of the glaze layer be about 1 mm.

The dot number of the heat-generating elements per mm of the length in the direction orthogonal to the scanning direction of the thermal head differs according to the required resolving power, but generally, it is preferred that the dot number be 3 to 16 dots, especially 6 to 10 dots. per mm. According to the present invention, the distance l between every two adjacent heat-generating elements can be maintained at 5 to 100 μm, especially 8 to 50 μm, without forming any blank space between every two adjacent dots.

When an electric power is supplied to the heat-generating elements $2_1$ through $2_n$ shown in FIG. 2, there is produced such a temperature distribution that in the regions close to the upper side $x_1$ and lower side $x_2$, the temperature is relatively low, and the temperature is elevated toward the central portion and a relatively high constant temperature is maintained in the central portion. Also in the printing dot formed by this heat-generating element, the density is low in the regions close to the upper and lower sides and the density is high in the central portion. When a continuous image is formed by a plurality of printing dots, in order to form a solid black image, it is important that the projection scanning regions of every two adjacent heat-generating elements should overlap each other only over a minute space t. It is ordinarily preferred that this overlapping width t be 1 to 30 μm.

In the thermal head of the present invention having the above-mentioned structure, an electric signal is applied from an external circuit through the electrodes 3 of the substrate 1 and the heat-generating resistor elements $2_1$ through $2_n$ are selectively actuated to generate Joule heat, and simultaneously, the substrate 1 is gradually moved in the direction of the arrow, whereby desired thermal printing is effected on a recording medium at a high image sharpness.

In the foregoing embodiment, the heat-generating resistor elements $2_1$ through $2_n$ are inclined downward to the left with respect to the scanning direction. Alternatively, heat-generating resistor elements may be inclined downward to the right with respect to the scanning direction. Moreover, the inclination angle may be changed. For example, as shown in FIG. 4. two rows of heat-generating resistor elements may be arranged obliquely to the scanning direction of the substrate to increase the printing speed.

It is preferred that the angle α between the arrangement line m of the heat-generating elements and the scanning direction of the substrate (see FIG. 2) be 30° to 60°, especially 40° to 50°. If the angle α is too small and below the above range, the size of the thermal head is increased, and if the angle α is too large and exceeds the above range, it is difficult to provide a sufficient clearance l between two adjacent heat-generating elements.

Referring to FIG. 5-A illustrating one preferred embodiment of the present invention. a ridged glaze layer 4 is formed on the surface of the substrate 1 obliquely to the scanning direction of the thermal head. A group of heat-generating elements $2_1$ through $2_n$ are arranged in the central portion of this glaze layer 4. In this embodiment, the connection edge side $2_z$ of each heat-generating resistor 2 to the individual electrode 3*a* and the connection edge side $2_y$ of the heat-generating resistor 2 to the common electrode 3*b* are in parallel to the arrangement direction m of the entire heat-generating elements, that is, the extension direction of the ridged glaze layer 4.

In this embodiment, each of the heat-generating elements $2_1$ through $2_n$ is extended in the scanning direction of the thermal head and has a shape of a parallelogram. These heat-generating elements are arranged so that the projection scanning regions of every two adjacent heat-generating elements overlap each other only over a space t. In the parallelogram shape of the heat-generating element, since a larger quantity of heat is given to the central rectangular portion 5, the printing density in this portion 5 is increased, but since the quantity of heat is given to the terminal triangular portions 5a and 5b is small, the printing density in these portions 5a and 5b is low. In the preferred embodiment of the present invention, the heat-generating elements having a shape of a parallelogram are arranged so that the lower triangular portion 5a of each heat-generating element overlaps the upper triangular portion 5b of the adjacent heat-generating element with respect to the scanning direction, whereby a solid black image uniform in the density can be printed.

The embodiment shown in FIG. 5-B is identical with the embodiment shown in FIG. 5-A except that the heat-generating elements and pairs of the electrodes are arranged so that they intersect the ridged glaze layer 4 orthogonally.

In the embodiments of the present invention illustrated in FIGS. 5-A and 5-B, the ridged glaze layer 4 for improving the thermal response characteristics is formed below the heat-generating resistor elements $2_1$ through $2_n$, and all of the heat-generating resistor elements $2_1$ through $2_n$ are arranged substantially in the central portion of the glaze layer 4. Accordingly, a good contact is maintained between the heat-generating resistor elements and a recording medium (not shown) and a very sharp image can be printed.

As is apparent from the foregoing description, in the thermal head of the present invention, a plurality of heat-generating elements are arranged on a line oblique to the scanning direction of the substrate so that no blank space is formed between every two adjacent heat-generating elements with respect to the direction orthogonal to the scanning direction. By dint of this characteristic feature, mutual thermal influences in the heat-generating resistor elements can be completely eliminated and no blank space is formed in a printed image. Accordingly, a print of a high quality can be obtained by the thermal head of the present invention.

We claim:

1. A thermal head of the type used for serial printing and having a scanning direction associated therewith, comprising:

a substrate;

a ridged glaze layer formed on the surface of the substrate and extending obliquely to the scanning direction of the thermal head;

a group of heat-generating elements, each of said heat-generating elements comprising a heat-generating resistor and a pair of electrodes connected in series to the heat-generating resistor at opposite connection edge sides of said resistor arranged in the transverse direction of the ridged glaze layer and spaced apart a small interval from the adjacent heat-generating elements, each of said heat-generating resistors being arranged in the central portion of the ridged glaze layer and having a parallelogram shape in which both of the connection edge sides of the heat-generating resistor are parallel to the extension direction of the ridged glaze layer; and wherein each of said adjacent heat-generating resistors are arranged so that one triangular corner of the heat-generating resistor located on one connection edge side overlaps another triangular corner of the adjacent heat-generating resistor located on another connection edge side with respect to the scanning direction.

2. A thermal head as said forth in claim 1, wherein:

the angle (α) between the arrangement line (m) of the ridged glaze layer and the scanning direction of the thermal head is 30° to 60°;

every two adjacent heat-generating resistors overlap each other over a width (t) to 1 to 30 μm with respect to the scanning direction;

the distance (l) between every two adjacent heat-generating resistors is 5 to 100 μm; and the dot number of heat-generating resistors per unit length, expressed in millimeters, in the direction orthogonal to the scanning direction of the thermal head is 3 to 16.

3. A thermal head for use with a serial thermal printer of the type which forms characters by moving a thermal head in a scanning direction relative to the print medium, said thermal head comprising:

a substrate;

an elongated glaze layer formed on said substrate, the elongated direction of said glaze layer forming an oblique angle with said scanning direction of the thermal head;

a plurality of heat-generating elements formed on said glaze layer and extending transversely across said glaze layer, said heat-generating elements being formed in one or more groups with the heat-generating elements within each group closely spaced apart along the elongated direction of said glaze layer; and wherein said oblique angle and the spacing of said heat-generating elements are chosen such that a specified portion of each two adjacent heat-generating elements within a group overlap when projected along said scanning direction, said overlapping portions having a shape such that the total portion of heat-generating elements intersecting the scanning direction is relatively constant within each group of heat-generating elements.

4. A thermal head as set out in claim 3, wherein each of said heat-generating elements comprises a resistor, first and second conductive electrodes electrically coupled to opposite ends, respectively, of said resistor and wherein said resistor has a parallelogram shape and is aligned with respect to the glaze layer such that the end sides of said resistor coupled to said electrodes are parallel to the elongated direction of said glaze layer.

5. A thermal head as set out in claim 3, wherein each of said heat-generating elements comprises a resistor, first and second electrically conductive electrodes electrically coupled to said resistor at opposite connection ends, respectively, of said resistor, said resistor having a rectangular shape aligned with respect to the elongated axis of said glaze layer such that said connection end sides are parallel to the elongated direction of said glaze layer.

6. A thermal head as set out in claim 3, wherein each of said heat-generating elements comprises a resistor and electrically conductive electrodes electrically coupled at opposite connection ends of said resistor and wherein said resistors have a shape and alignment such that said overlapping portions thereof have a triangular shape.

7. A thermal head as set out in claim 3, wherein said oblique angle is between 30° and 60°.

8. A thermal head as said forth in claim 3, wherein:

the angle between the elongated direction of the ridged glaze layer and the scanning direction of the thermal head is 30° to 60°;

every two adjacent heat-generating resistors overlap each other over a width of from 1 to 30 μm with respect to the scanning direction;

the distance between every two adjacent heat-generating resistors is from 5 to 100 μm; and the dot number of heat-generating resistors per unit length, within a group, expressed in millimeters, in the direction orthogonal to the scanning direction of the thermal head is 3 to 16.

* * * * *